United States Patent
Dlugoss

(10) Patent No.: US 7,590,480 B2
(45) Date of Patent: Sep. 15, 2009

(54) ADAPTIVE SHIFT LEARN CONTROL FOR AUTOMATIC TRANSMISSIONS

(75) Inventor: Randall B. Dlugoss, Royal Oak, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 833 days.

(21) Appl. No.: 11/175,115

(22) Filed: Jul. 5, 2005

(65) Prior Publication Data

US 2007/0010926 A1  Jan. 11, 2007

(51) Int. Cl.
*G06F 17/00* (2006.01)
(52) U.S. Cl. ............... 701/51; 701/67; 701/68; 701/58; 701/60
(58) Field of Classification Search ............ 701/51, 701/55, 56, 578, 58, 59, 60, 61, 57, 67, 68; 477/155, 156, 158, 159, 161
See application file for complete search history.

(56) References Cited

U.S. PATENT DOCUMENTS

| | | | | |
|---|---|---|---|---|
| 4,707,789 A | * | 11/1987 | Downs et al. | 701/58 |
| 5,072,390 A | * | 12/1991 | Lentz et al. | 701/60 |
| 5,737,712 A | * | 4/1998 | Han et al. | 701/51 |
| 7,356,398 B2 | * | 4/2008 | Steinmetz et al. | 701/55 |

* cited by examiner

Primary Examiner—Richard M. Camby

(57) ABSTRACT

An adaptive shift learn control system for rapidly updating an adaptive shift system that regulates shifting of a transmission includes first and second clutches and a control module that cycles the first clutch between an ON state and an OFF state while the second clutch is in a full OFF state. The control module monitors a parameter of the transmission during the cycling, calculates a clutch characteristic based on the parameter and updates the adaptive shift control system based on the clutch characteristic.

30 Claims, 6 Drawing Sheets

ADAPTIVE SHIFT LEARN CONTROL FOR AUTOMATIC TRANSMISSIONS

FIELD OF THE INVENTION

The present invention relates to vehicle transmissions, and more particularly to a transmission control system for rapidly updating an adaptive shift control in a transmission.

BACKGROUND OF THE INVENTION

Internal combustion engines combust a fuel and air mixture within cylinders driving pistons to produce drive torque. The engine drives a transmission through a coupling device. In the case of an automatic transmission, the coupling device includes a torque converter. The transmission transfers the drive torque to a driveline through one of a plurality of gear ratios. The transmission shifts between gear ratios based on a shift schedule and vehicle operating conditions.

The transmission typically includes a plurality of clutches that are selectively engaged to establish a desired gear ratio. When shifting between gear ratios, clutch-to-clutch shifts occur. More specifically, at least one clutch is disengaged (i.e., off-going clutch) while another clutch is concurrently engaged (i.e., on-coming clutch). Control of the clutch-to-clutch shift is based on an estimated engine torque ($T_{EST}$) and other shift parameters including, but not limited to, a clutch fill time, a clutch pressure offset and a clutch full feed fill threshold (FFFT) pressure. $T_{EST}$ is determined using a torque estimating calculation that is based on engine operating conditions. The clutch fill time, the clutch pressure offset and clutch FFFT pressure for each clutch, however, are adaptively learned and updated during vehicle operation.

When the vehicle first rolls off the assembly line and/or service has been performed on the transmission, the shift parameters are set to initial values and do not include the benefit of the adaptive/learned shift control. As a result, the transmission shift quality is not as high as desired. Traditionally, a technician would be required to drive the vehicle over a series of drive cycles to improve the shift quality using the adaptive shift control before providing the vehicle to the customer. Driving the vehicle increases time and cost, and exposes the manufacturer to unnecessary liability.

SUMMARY OF THE INVENTION

Accordingly, the present invention provides an adaptive shift learn control system for rapidly updating an adaptive shift system that regulates shifting of a transmission. The adaptive shift learn control system includes first and second clutches and a control module that cycles the first clutch between an ON state and an OFF state while the second clutch is in a full ON state. The control module monitors a parameter of the transmission during the cycling, calculates a clutch characteristic based on the parameter and updates the adaptive shift control system based on the clutch characteristic.

In another feature, the control module switches the first clutch between full ON and full OFF states.

In another feature, the control module ramps the clutch between the ON and OFF states.

In other features, the parameter includes a torque converter slip speed and the clutch characteristic includes a fill time of the first clutch. The fill time is determined based on a time between switching the first clutch to a full ON state and the torque converter slip speed increasing.

In other features, the parameter includes a hydraulic pressure of the first clutch. The clutch characteristic includes an offset pressure of said first clutch. The offset pressure is equal to the hydraulic pressure at a point where a torque converter slip speed decreases while decreasing the hydraulic pressure. Alternatively, the clutch characteristic includes a full feed fill threshold pressure. The full feed fill threshold is equal to the hydraulic pressure at a point where a switch state of a pressure switch associated with the first clutch switches to an ON state.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
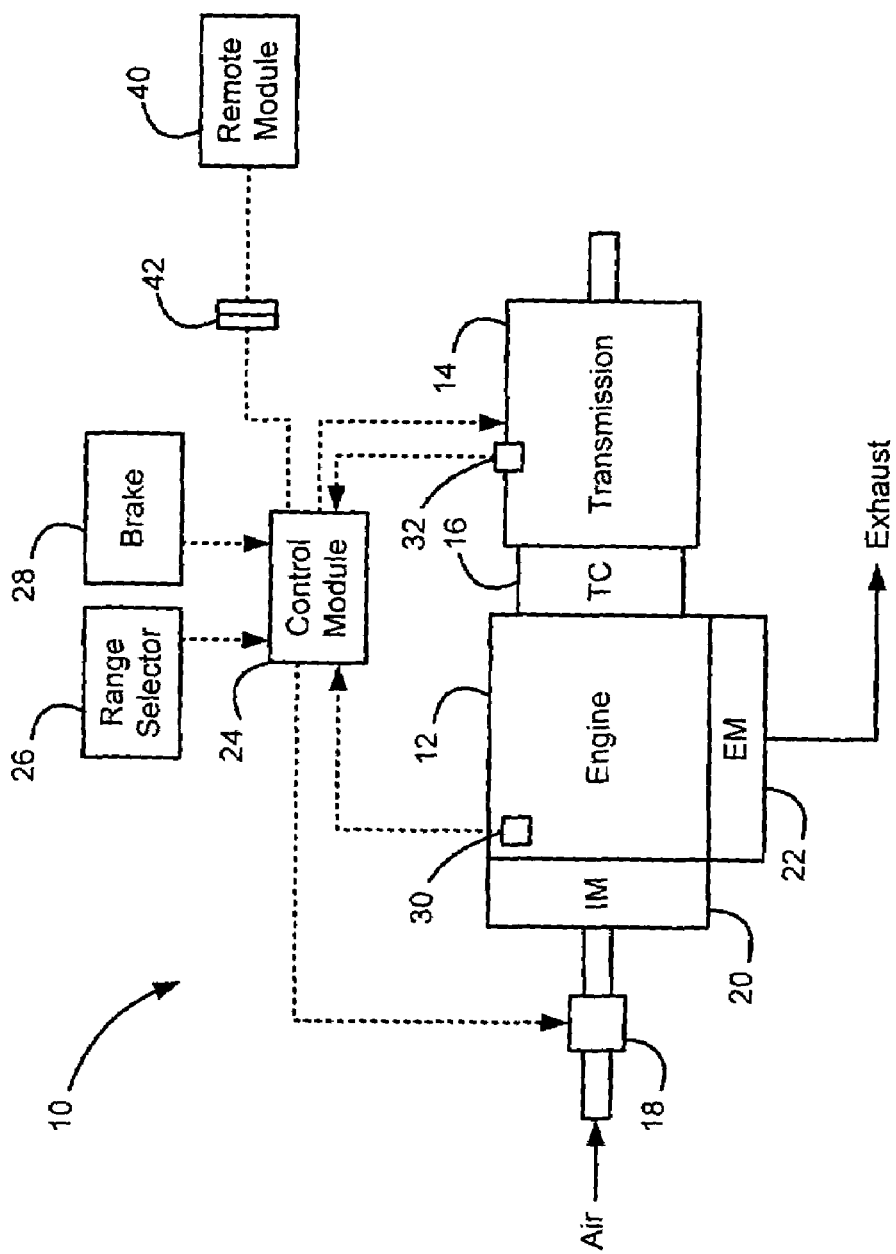
FIG. 1 is a functional block diagram of an exemplary vehicle system.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary vehicle system 10 is schematically illustrated. The vehicle system 10 includes an engine 12 that combusts a fuel and air mixture within cylinders (not shown) to drive pistons slidably disposed within the cylinders. The pistons drive a crankshaft (not shown) that drives a transmission 14 through a torque converter 16. Air is drawn through a throttle 18 and into an intake manifold 20 that distributes air to the individual cylinders. Exhaust generated by the combustion process is exhausted to an after-treatment system (not shown) through an exhaust manifold 22.

The torque converter 16 is a fluid coupling that enables the engine to spin somewhat independently of the transmission 14. Although not illustrated, the torque converter 16 includes a pump, a turbine and a stator. The pump is a centrifugal pump that is driven by the engine 12. Fluid pumped by the pump, drives the turbine, which in turn drives the transmission 14. The stator redirects fluid returning from the turbine before it hits the pump again to increase the efficiency of the torque converter 16. In a torque converter stall condition, the pump is turning but the turbine is not.

A control module 24 regulates operation of the vehicle system 10. More specifically, the control module 24 operates the engine 12 and transmission 14 based on signals from operator input devices including, but not limited to, a range selector 26 and a brake pedal 28. The range selector 26 enables the operator to put the transmission 14 into one of a plurality of ranges including, but not limited to, a drive range (D), a reverse range (R), a neutral range (N) and a park range (P). The control module 24 also regulates engine operation based on signals from various sensors including, but not limited to, an engine RPM sensor 30 and a transmission line pressure sensor 32.

A remote module 40 is selectively linked for communication with the control module 24 through an interface 42. The remote module 40 provides an operator input for initiating and regulating the adaptive shift learn control of the present invention. More specifically, the remote module 40 initiates the adaptive shift learn control when the enable conditions are present. The remote module 40 further provides prompts to the operator as the adaptive shift learn control is executed.

Figure 2:
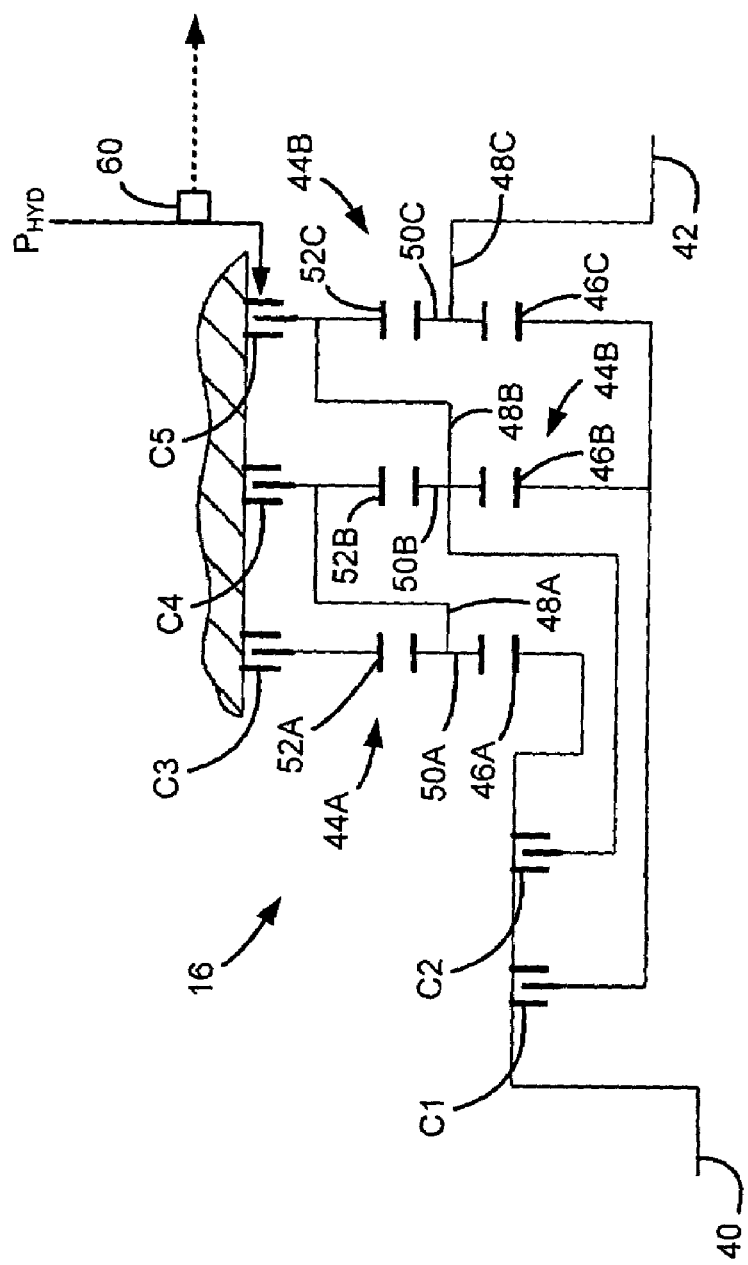
FIG. 2 is a functional block diagram of an exemplary transmission.

Referring now to FIG. 2, an exemplary transmission 16 is illustrated. The exemplary transmission 14 is a six-speed automatic transmission that is disclosed in commonly assigned U.S. Pat. No. 6,308,125, issued on Oct. 23, 2001 and entitled Adaptive Clutch Control of a Closed-Throttle Downshift, the disclosure of which is expressly incorporated herein by reference. It is appreciated that the specific transmission described herein is merely exemplary in nature and that the adaptive shift learn control system of the present invention can be implemented with various other transmissions.

The transmission 14 includes an input shaft 40, an output shaft 42 and three inter-connected planetary gear sets 44A, 44B and 44C, respectively. The planetary gear sets 44A,44B, 44C include respective sun gears 46A,46B,46C, carriers 48A, 48B,48C, planetary gears 50A,50B,50C and ring gears 52A, 52B,52C. The transmission 14 further includes clutches C1-C5 that are selectively engaged to establish a desired gear ratio of the transmission 14. More specifically, the input shaft 40 continuously drives the sun gear 46A of the gear set 44A, selectively drives the sun gears 46B,46C of the gear sets 44B,44C via the clutch C1 and selectively drives the carrier 48B of the gear set 44B via the clutch C2. The ring gears 52A,52B,52C of the gear sets 44A,44B,44C are selectively grounded via the clutches C3, C4 and C5, respectively. Hydraulic pressure ($P_{HYD}$) is selectively provided to the various clutches to regulate engagement of the clutches. A pressure switch 60 is associated with the pressure line to each clutch and switches between ON and OFF states. More specifically, when $P_{HYD}$ is below a threshold pressure ($P_{THR}$), the switch is in the OFF state. When $P_{HYD}$ is greater than $P_{THR}$, the switch state is ON.

As diagrammed in Table 1 below, the state of the clutches C1-C5 (i.e., engaged or disengaged) can be controlled to provide six forward speed ratios (1, 2, 3, 4, 5, 6), a reverse speed ratio (R) or a neutral condition (N).

TABLE 1

|     | C1 | C2 | C3 | C4 | C5 |
|-----|----|----|----|----|----|
| 1st | X  |    |    |    | X  |
| 2nd | X  |    |    | X  |    |
| 3rd | X  |    | X  |    |    |
| 4th | X  | X  |    |    |    |
| 5th |    | X  | X  |    |    |
| 6th |    | X  |    | X  |    |

TABLE 1-continued

|   | C1 | C2 | C3 | C4 | C5 |
|---|----|----|----|----|----|
| R |    |    | X  |    | X  |
| N |    |    |    |    | X  |

For example, the second forward speed ratio is established when clutches C1 and C4 are engaged. Shifting from one speed forward speed ratio to another is generally achieved by disengaging one clutch (i.e., the off-going clutch) while engaging another clutch (i.e., the on-coming clutch). For example the transmission is downshifted from second to first by disengaging clutch C4 while engaging clutch C5.

The adaptive shift learn control of the present invention is used after initial assembly of the vehicle and/or after service has been performed on the transmission. The adaptive shift learn control exercises the clutches and characteristics of each clutch are measured and an adaptive shift system is updated based on the measurement. The clutch-to-clutch architecture of the transmission is used to independently control and monitor the clutches. More specifically, up to two secondary clutches are applied to transfer torque to the output shaft or tie-down the output shaft to enable the turbine to tie-up when a primary clutch or test clutch is applied.

The adaptive shift learn control monitors a plurality of events and operating parameters to determine the characteristics of the particular test clutch. These events include, but are not limited to, the transmission temperature ($T_{TRANS}$) being within a normal operating range, the transmission output speed at zero RPM, the engine RPM within a desired range (e.g., at or near 1500 RPM), the transmission line pressure within a desired range (e.g., at or near 900 kPa), the commanded clutch pressure ($P_{COM}$), which is dependent on the test cycle and the clutch, and pressure switch states (e.g., ON/OFF). The adaptive shift learn control is designed to provide the best results under the most consistent operating conditions. Therefore, any changes occurring that effect these results will stop the adaptive shift learn control until they are corrected.

Further, internal control checks are implemented to monitor DTCs, operator responses, and vehicle movement. Any vehicle movement or conditions that could induce vehicle movement during execution of the adaptive shift learn control stops the control routine until the conditions are corrected. If corrections are not made within a threshold time limit, the adaptive shift learn control aborts. A failsafe feature requires vehicle shutdown before any normal transmission operation may resume because all of the clutches are locked into no pressure states.

Figure 3:
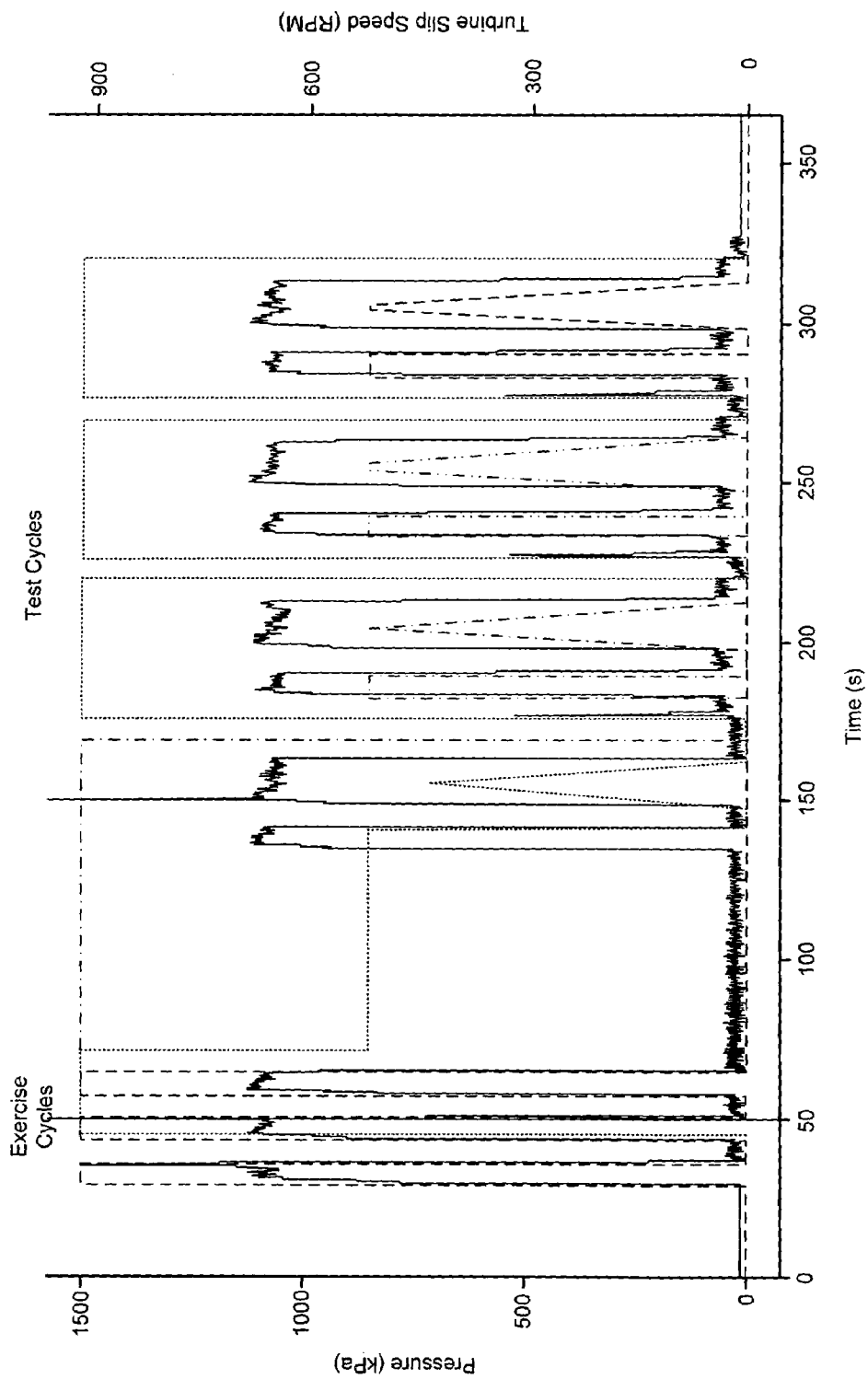
FIG. 3 is a graph illustrating exemplary cycles executed by an adaptive shift control system in accordance with the present invention.

Referring now to FIG. 3, the adaptive shift learn control includes multiple clutch exercise cycles and multiple test cycles for data collection and learning clutch characteristics. More specifically, all of the clutches are exercised before testing. Exercising purges air from the clutches, de-fuzzes the clutch surfaces, warms up the clutches and moves lubricants into parts that have not moved since vehicle and/or service has been completed. The exercise cycles pressurize the clutches until the turbine speed drops to zero. The clutches are then exhausted. This is repeated as needed and is regulated via calibrations.

Three key clutch parameters are determined during execution of the adaptive shift learn control. These parameters include clutch fill time ($t_{CLFILL}$), full feed fill threshold pressure ($P_{FFFT}$) and clutch pressure offset ($P_{CLOFFSET}$). It should be noted that the measured values of these parameters may not be accurate compared to other methods of measurement. However, the results are meant to be a high correlation to the adaptive values used by the transmission adaptive shift system. Therefore, look-up tables are used to update the shifts based on the measured parameters. In this manner, unaccounted variables are compensated for to provide repeatable results.

Figure 4:
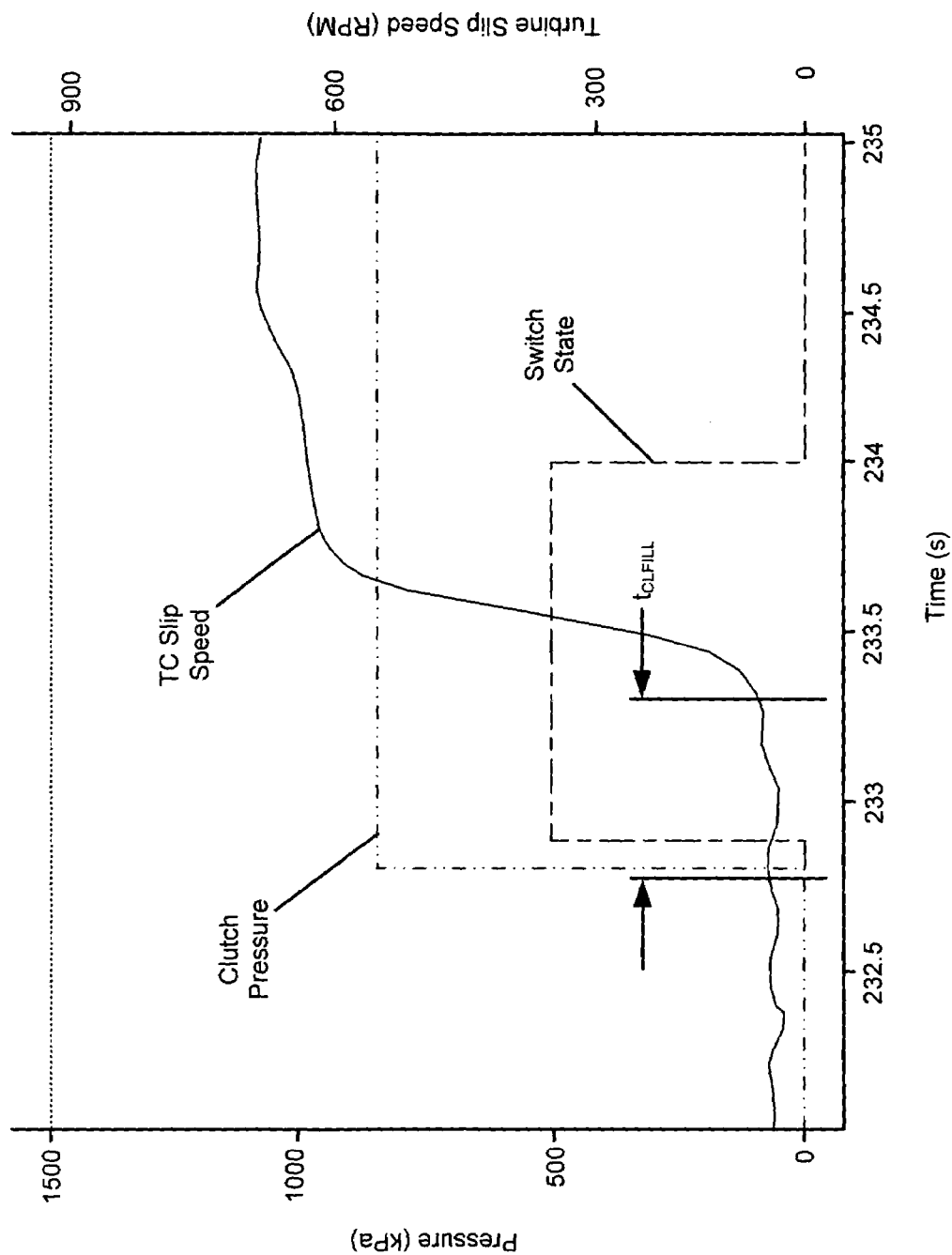
FIG. 4 is a graph illustrating a detailed view of an exemplary cycle of FIG. 3 for determining a clutch fill time in accordance with the present invention.
Figure 5:
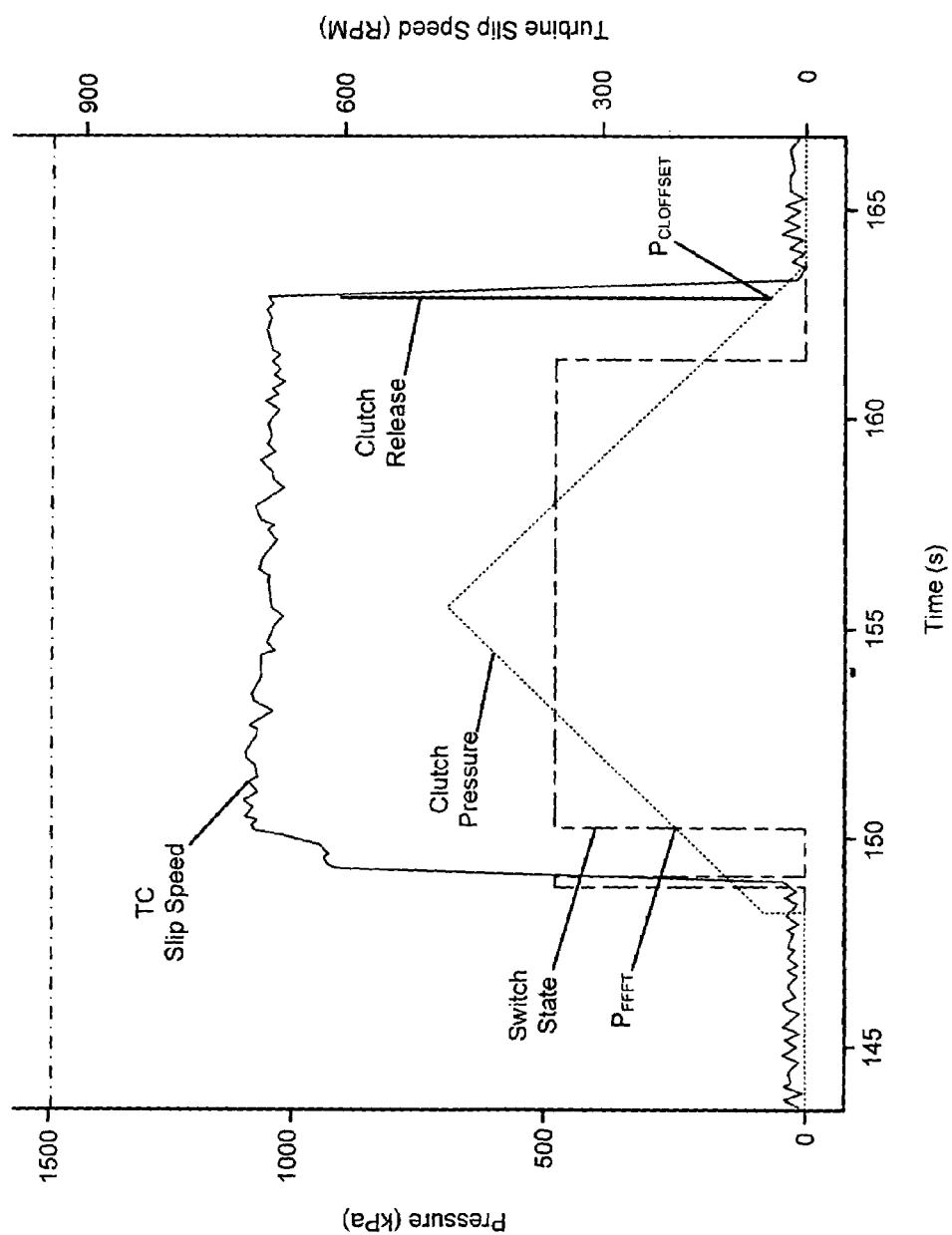
FIG. 5 is a graph illustrating a detailed view of another exemplary cycle of FIG. 3 for determining a full feed fill threshold pressure ($P_{FFFT}$) and clutch pressure offset ($P_{CLOFFSET}$) in accordance with the present invention.

Referring not to FIGS. 4 and 5, the test cycles of the adaptive shift learn control are performed as one cycle per clutch. The operator is prompted to select D (i.e., to test the forward clutches) or R (to test the reverse clutch(es)). $t_{CLFILL}$ is determined based on the time between $P_{COM}$ being issued and a turbine speed slip being achieved. $t_{CLFILL}$ is used to calculate clutch circuit volume ($V_{CLUTCH}$), which is an important measure to understand how the clutch applies as control pressure varies and how much clutch capacity remains during a shift event. Because the transmission output speed is zero and the test clutch under ties down the transmission input speed, the clutch is nearly full at turbine speed slip. $V_{CLUTCH}$ is determined from the $t_{CLFILL}$ and is used by an adapt procedure to determine clutch apply capacity, rates and timing for dynamic control pressure. $V_{CLUTCH}$ is determined as follows:

$$V_{CLUTCH} = \text{Flow Rate} * t_{CLFILL}$$

Alternatively, $V_{CLUTCH}$ is determined from a look-up table as a function of the $t_{CLFILL}$. More specifically, control transmissions (e.g., minimum, nominal, maximum) are used to calibrate the relationship between the $t_{CLFILL}$ and $V_{CLUTCH}$ and the look-up table is constructed based thereon.

$P_{FFFT}$ represents the threshold below which the pressure regulator is regulating and above which the clutch is filling using full feed pressure (i.e. restricted only by line and fixed circuit restrictions). $P_{FFFT}$ varies due to production variation and component wear. This value is important to understand the maximum pressure operating range of the clutch. The shift system uses $P_{FFFT}$ to sense clutch pressure using only $P_{COM}$ in the absence of a pressure sensor. $P_{FFFT}$ is determined by ramping the clutch pressure (i.e., applying the clutch) until the associated pressure switch changes state. A change in switch state represents the clutch value no longer regulating. Ramp rates are based on clutch system performance and are different for each clutch. Control transmissions are used to calibrate the ramp rate for each clutch. The transmission line pressure is held constant. The final $P_{FFFT}$ is determined from a look-up table as a function of the measured $P_{FFFT}$.

$P_{CLOFFSET}$ represents the commanded pressure at which no clutch capacity is present at the clutch. $P_{CLOFFSET}$ is close to the mid-point between $P_{FFFT}$ and the clutch release pressure value and is important to understand the clutch operating characteristics. $P_{CLOFFSET}$ varies due to production variation and component wear. The ramp off to exhaust clutch pressure slowly releases the clutch. At release the remaining $P_{COM}$ equals the pressure in the clutch. $P_{CLOFFSET}$ is measured by ramping off the pressure from the clutch until the input speed slip decreases to near zero. The engine provides drive torque to the clutch and $P_{CLOFFSET}$ is achieved, the clutch will barely hold (i.e., high clutch slip with low input speed slip). The final $P_{CLOFFSET}$ value used by the adaptive shift system is determined from a look-up table as a function of the measured $P_{CLOFFSET}$.

Upon completion of the cycles, the three characteristics are compared to practical thresholds to check the rationality of the values. Further, the three characteristics learned for each of the clutches are stored into non-volatile memory and a test flag ($FLAG_{TEST}$) for each clutch is set (i.e., equal to 1) indicating that the adaptive shift learn control was successfully executed for the particular clutch. However, if the three characteristics for a particular clutch are not considered rational (i.e., based upon the comparison with the practical thresholds), $FLAG_{TEST}$ is not set for that clutch. The clutch is then re-cycled for a threshold number of times (e.g., three). If the three characteristics remain non-rational, the adaptive shift learn control is aborted and an error flag is set.

After the vehicle is shut down and powered back up, the control module 24 determines whether $FLAG_{TEST}$ is set for each clutch. If $FLAG_{TEST}$ is set, the adaptive shift control that regulates shifting of the transmission is updated based on the characteristics stored for each of the clutches. After the adaptive shift control is updated, $FLAG_{TEST}$ is reset (i.e., equal to 0).

Figure 6:
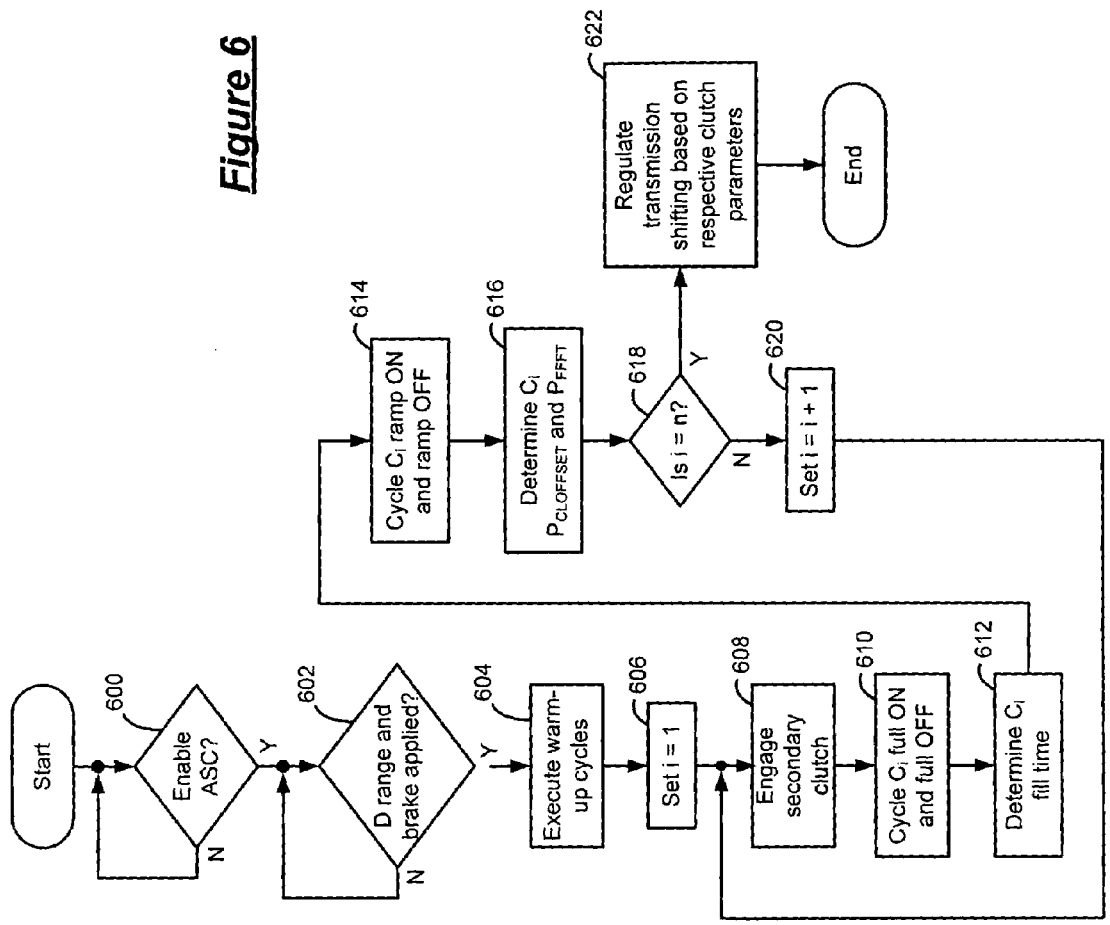
FIG. 6 is a flowchart illustrating exemplary steps executed by the adaptive shift control system.

Referring now to FIG. 6, exemplary steps executed by the adaptive shift learn control of the present invention will be described in detail. In step 600, control determines whether to enable the adaptive shift learn control. If the adaptive shift learn control is not enabled, control loops back. If the adaptive shift learn control is enabled, control determines whether D range is selected and the vehicle brake is applied in step 602. If D range is not selected or the brake is not applied, control loops back. If D range is selected and the brake is applied, control executes the warm-up cycles in step 604. In step 606, control sets a counter i equal to one.

In step 608, control engages a secondary clutch or clutch(es) to provide a tie-up condition of the transmission. Control cycles a clutch $C_i$ full On and full OFF in step 610. In step 612, control determines the clutch fill time of $C_i$ based on the time at which the turbine slip increases after full ON (see FIG. 4). In step 614, control cycles $C_i$ to ramp ON and ramp OFF. Control determines $P_{CLOFFSET}$ and $P_{FFFT}$ for $C_i$ in step 616. In step 618, control determines whether i is equal to n, where n equal the number of clutches. If i is not equal to n, control increases i in step 620 and loops back to step 608. If i is equal to n, control updates the adative shift control based on the learned parameters to regulate transmission shifting in step 622 and control ends. If i is not equal to n, control Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An adaptive shift learn control system for rapidly updating an adaptive shift system that regulates shifting of a transmission, comprising:

first and second clutches of said transmission; and a control module that cycles said first clutch between an ON state and an OFF state while said second clutch is in a full ON state, that monitors a parameter of said transmission during said cycling, that calculates a clutch characteristic based on said parameter and that updates said adaptive shift control system based on said clutch characteristic.

2. The adaptive shift learn control system of claim 1 wherein said control module switches said first clutch between full ON and full OFF states.

3. The adaptive shift learn control system of claim 1 wherein said control module ramps said first clutch between said ON and OFF states.

4. The adaptive shift learn control system of claim 1 wherein said parameter includes a torque converter slip speed and said clutch characteristic includes a fill time of said first clutch.

5. The adaptive shift learn control system of claim 4 wherein said fill time is determined based on a time between switching said first clutch to a full ON state and said torque converter slip speed increasing.

6. The adaptive shift learn control system of claim 1 wherein said parameter includes a hydraulic pressure of said first clutch.

7. The adaptive shift learn control system of claim 6 wherein said clutch characteristic includes an offset pressure of said first clutch.

8. The adaptive shift learn control system of claim 7 wherein said offset pressure is equal to said hydraulic pressure at a point where a torque converter slip speed decreases while decreasing said hydraulic pressure.

9. The adaptive shift learn control system of claim 6 wherein said clutch characteristic includes a full feed fill threshold pressure.

10. The adaptive shift learn control system of claim 9 wherein said full feed fill threshold is equal to said hydraulic pressure at a point where a switch state of a pressure switch associated with said clutch switches to an ON state.

11. A method of updating adaptive shift learn set-points for regulating shifting of a transmission, comprising:
cycling a clutch of said transmission between an ON state and an OFF state;
monitoring a parameter of said transmission during said cycling;
calculating a clutch characteristic based on said parameter; and
updating an adaptive shift control system that regulates shifting of said transmission based on said clutch characteristic,
wherein said parameter includes a torque converter slip speed and said clutch characteristic includes a fill time of said clutch, and wherein said fill time is determined based on a time between switching said clutch to a full ON state and said torque converter slip speed increasing.

12. The method of claim 11 wherein said cycling includes switching said clutch between full ON and full OFF states.

13. The method of claim 11 wherein said cycling includes ramping said clutch between said ON and OFF states.

14. The method of claim 11 wherein said parameter includes a hydraulic pressure of said clutch.

15. The method of claim 14 wherein said clutch characteristic includes an offset pressure of said clutch.

16. The method of claim 15 wherein said offset pressure is equal to said hydraulic pressure at a point where a torque converter slip speed decreases while decreasing said hydraulic pressure.

17. The method of claim 14 wherein said clutch characteristic includes a full feed fill threshold pressure.

18. The method of claim 17 wherein said full feed fill threshold is equal to said hydraulic pressure at a point where a switch state of a pressure switch associated with said clutch switches to an ON state.

19. A method of updating adaptive shift learn set-points for regulating shifting of a transmission, comprising:
engaging one of a plurality of clutches of said transmission to a full ON state to induce a tie-up condition of said transmission;
cycling another clutch of said plurality of clutches between an ON state and an OFF state;
monitoring a parameter of said transmission during said cycling;
calculating a clutch characteristic based on said parameter; and
updating an adaptive shift control system that regulates shifting of said transmission based on said clutch characteristic.

20. The method of claim 19 wherein said cycling includes switching said another clutch of said plurality of clutches between full ON and full OFF states.

21. The method of claim 19 wherein said cycling includes ramping said another clutch of said plurality of clutches between said ON and OFF states.

22. The method of claim 19 wherein said parameter includes a torque converter slip speed and said clutch characteristic includes a fill time of said clutch.

23. The method of claim 22 wherein said fill time is determined based on a time between switching said another clutch of said plurality of clutches to a full ON state and said torque converter slip speed increasing.

24. The method of claim 19 wherein said parameter includes a hydraulic pressure of said another clutch of said plurality of clutches.

25. The method of claim 24 wherein said clutch characteristic includes an offset pressure of said another clutch of said plurality of clutches.

26. The method of claim 25 wherein said offset pressure is equal to said hydraulic pressure at a point where a torque converter slip speed decreases while decreasing said hydraulic pressure.

27. The method of claim 24 wherein said clutch characteristic includes a full feed fill threshold pressure.

28. The method of claim 27 wherein said full feed fill threshold is equal to said hydraulic pressure at a point where a switch state of a pressure switch associated with said another clutch of said plurality of clutches switches to an ON state.

29. A method of updating adaptive shift learn set-points for regulating shifting of a transmission, comprising:
cycling a clutch of said transmission between an ON state and an OFF state;
monitoring a parameter of said transmission during said cycling;
calculating a clutch characteristic based on said parameter; and
updating an adaptive shift control system that regulates shifting of said transmission based on said clutch characteristic,
wherein said parameter includes a hydraulic pressure of said clutch, wherein said clutch characteristic includes an offset pressure of said clutch, and wherein said offset pressure is equal to said hydraulic pressure at a point where a torque converter slip speed decreases while decreasing said hydraulic pressure.

30. A method of updating adaptive shift learn set-points for regulating shifting of a transmission, comprising:
cycling a clutch of said transmission between an ON state and an OFF state;
monitoring a parameter of said transmission during said cycling;
calculating a clutch characteristic based on said parameter; and
updating an adaptive shift control system that regulates shifting of said transmission based on said clutch characteristic,
wherein said parameter includes a hydraulic pressure of said clutch, wherein said clutch characteristic includes a full feed fill threshold pressure, and wherein said full feed fill threshold is equal to said hydraulic pressure at a point where a switch state of a pressure switch associated with said clutch switches to an ON state.

* * * * *

UNITED STATES PATENT AND TRADEMARK OFFICE
CERTIFICATE OF CORRECTION

PATENT NO. : 7,590,480 B2  Page 1 of 1
APPLICATION NO. : 11/175115
DATED : September 15, 2009
INVENTOR(S) : Randall B. Dlugoss It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1106 days.

Signed and Sealed this

Twenty-first Day of September, 2010

David J. Kappos
*Director of the United States Patent and Trademark Office*